(12) United States Patent
Pierce

(10) Patent No.: US 12,515,114 B2
(45) Date of Patent: Jan. 6, 2026

(54) SYSTEMS AND METHODS FOR DETERMINING AN OPTIMAL TEE ON A GOLF COURSE FOR A GOLFER

(71) Applicant: United States Golf Association, Liberty Corner, NJ (US)

(72) Inventor: David A. Pierce, Doylestown, PA (US)

(73) Assignee: United States Golf Association, Liberty Corner, NJ (US)

(*) Notice: Subject to any disclaimer, the term of this patent is extended or adjusted under 35 U.S.C. 154(b) by 121 days.

(21) Appl. No.: 18/538,411

(22) Filed: Dec. 13, 2023

(65) Prior Publication Data

US 2024/0189678 A1 Jun. 13, 2024

Related U.S. Application Data

(60) Provisional application No. 63/432,117, filed on Dec. 13, 2022.

(51) Int. Cl.
*A63B 57/00* (2015.01)
*A63B 57/10* (2015.01)
*A63B 71/06* (2006.01)

(52) U.S. Cl.
CPC .......... *A63B 57/0006* (2013.01); *A63B 57/10* (2015.10); *A63B 71/0622* (2013.01); *A63B 2225/20* (2013.01); *A63B 2225/50* (2013.01)

(58) Field of Classification Search
CPC .. A63B 57/0006; A63B 57/10; A63B 71/0622
See application file for complete search history.

(56) References Cited

U.S. PATENT DOCUMENTS

| | | | | |
|---|---|---|---|---|
| 8,529,380 | B1* | 9/2013 | Hubenthal | G06Q 30/02 473/223 |
| 10,682,569 | B1* | 6/2020 | Vale | A63B 24/0021 |
| 2002/0072815 | A1* | 6/2002 | McDonough | A63B 71/0669 700/92 |

(Continued)

OTHER PUBLICATIONS

Dave Tutelman, Tee It Forward, published on Jul. 19, 2019 and available online at https://www.tutelman.com/golf/justgolf/teeItForward.php (Year: 2019).*

*Primary Examiner* — James S. McClellan
(74) *Attorney, Agent, or Firm* — Pryor Cashman LLP

(57) ABSTRACT

A system and associated method for recommending to a user an optimal starting tee for one or more golf course holes of a golf course, including a host terminal including an application including program(s) of instruction embodied in a non-transitory computer readable medium and executable by a processor to configure the application and a user interface configured to receive instructions from the user requesting a recommendation of the optimal starting tee for the user from a plurality of designated starting tees for the one or more golf course holes and to present the recommendation to the user, and an apparatus including program(s) of instruction embodied in a non-transitory computer readable medium and executable by a processor to configure the apparatus and a determination module configured to determine the optimal starting tee for the user from the plurality of designated starting tees based on golf course information and user information.

17 Claims, 6 Drawing Sheets

(56) References Cited

U.S. PATENT DOCUMENTS

| | | | | |
|---|---|---|---|---|
| 2013/0331969 | A1* | 12/2013 | Piercy | A63B 71/0697 |
| | | | | 700/92 |
| 2016/0096102 | A1* | 4/2016 | Kalugin | G02B 27/017 |
| | | | | 473/407 |
| 2018/0200605 | A1* | 7/2018 | Syed | A63B 71/0669 |
| 2021/0252354 | A1* | 8/2021 | Isgar | A63B 55/40 |
| 2022/0111282 | A1* | 4/2022 | Everhart | H04W 4/80 |

\* cited by examiner

"No-name Lakes" Golf Course

This Course is categorized as a Difficulty Level 3 / Moderate (Orange Triangle) by the USGA Course Rating System A Level 3 / Moderate Orange Triangle Course has an average number of obstacles with normal difficulty. It is characterized by standard fairways, rough, hazards and overall challenges with occasional forced carries. It is mostly enjoyed by golfers of at least intermediate skill level who normally score less than 30 over par.

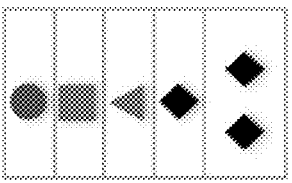

| Average Hitting Distance | | | Longest Forced Carry | Tee | Type | Recommended Effective Playing Length |
|---|---|---|---|---|---|---|
| Driver (yards) | 7-iron (yards) | PW (yards) | (yards) | | | (yards) |
| 125 | 80 | 55 | 60 | 5 | Physical | 4000 |
| 150 | 100 | 70 | 60 | 4.5 | Blended | 4400 |
| 165 | 110 | 80 | 75 | 4 | Physical | 4800 |
| 180 | 125 | 95 | 85 | 3.5 | Blended | 5200 |
| 200 | 135 | 105 | 95 | 3 | Physical | 5600 |
| 210 | 140 | 110 | 100 | 2.5 | Blended | 5800 |
| 220 | 145 | 115 | 100 | 2 | Physical | 6000 |
| 235 | 155 | 125 | 100 | 1.5 | Blended | 6300 |
| >250 | >165 | >135 | 100 | 1 | Physical | 6600 |

How to use this chart:
1) Measure (or estimate) your hitting distance for Driver, 7-iron and Pitching Wedge with a launch monitor or on a well calibrated driving range.
2) Locate the row which most closely matches your personal average total hitting distances (including carry, bounce and roll) for all three clubs.
3) Make sure you are comfortable with the longest forced carry for that tee. If not, move up until comfortable.
4) Read across to find the recommended tee and type as well as the effective Playing Length for that tee. Note that it will be different than the exact scorecard length for that tee because it accounts for doglegs, elevation change, forced layups and altitude.
5) Use the difficulty level of the course you play most often as a reference point. If you normally play a more difficult course, consider playing a longer course than you normally play. Conversely, if you normally play an easier course, consider playing a shorter course than recommended.

Fig. 5

SYSTEMS AND METHODS FOR DETERMINING AN OPTIMAL TEE ON A GOLF COURSE FOR A GOLFER

CROSS-REFERENCE TO RELATED APPLICATIONS

This application claims priority to U.S. Provisional Patent Application No. 63/432,117, filed Dec. 13, 2022, the disclosure and teachings of which are incorporated herein by reference.

TECHNICAL FIELD

The present application relates to a system and method for determining an optimal tee on a golf course for a golfer, particularly a system and method capable of determining an optimal tee in real time golf play.

BACKGROUND OF THE INVENTION

Golf is a sport in which a player, also called the golfer, uses various clubs to hit a golf ball from a designated starting tee into a hole on a golf course using the fewest number of strokes possible. Golf courses vary in their dimensions, including size, length and number of holes available to play, and typically strive to accommodate golfers of all skill levels. As such, playing from the same starting tee may not be suitable for all golfers. In other words, a professional golfer or a scratch golfer may easily play from a designated starting tee, but a non-professional golfer, e.g., an amateur or beginner golfer, may have issues with playing from the same tee. For example, a non-professional golfer may be exhausted from playing a single course from designated starting tees or may be frustrated by the length of time to play the course. Indeed, such problems are exacerbated by the fact that a game of golf typically includes a course with multiple holes; the standard number of holes is 18, which on average requires several hours to play.

Differences between golfers arise from the fact that not all golfers have the same endurance, strength, knowledge of techniques, or skill to effectively hit the golf ball. As such, to account for the differences in skill levels of golfers, a golf course may include multiple starting tees. In other words, beginners or golfers who hit the ball shorter distances, may be best suited to play on a starting tee that is closer or closest to the hole. On the other hand, professional golfers or golfers who hit the ball further distances may play from a starting tee that is farthest from the hole.

With multiple starting tees available to golfers, it is within the discretion of the golfer to select the appropriate starting tee based on their playing ability, including the golfer's individual endurance, strength, knowledge of techniques, or skill to effectively hit the golf ball. United States Golf Association (USGA) research has demonstrated that golfers have a difficult time gauging their playing ability and may instead select a sub-optimal tee, which may lead to the golfer's being discontented with the game. Such difficulties are increased due to the fact that each golf course is unique, e.g., length, size, and varying physical features. For example, a longer course may be more challenging than a shorter course, but in cases in which the shorter course includes multiple steep hills, obstacles or other environmental impediments, the shorter course may actually be more challenging than the longer course. Consequently, it may be complicated for a golfer to assess and determine the relative difficulty level associated with a golf course or its individual holes.

While there are several existing systems which attempt to provide golfers with starting tee recommendations, e.g., Longleaf, Tee It Forward, PGAoA Set-up for Success, and 5-iron×36, these systems often fail to provide the necessary accuracy for selecting an optimal tee. One reason for this failure is that the systems are often not readily transferable to different golf courses. For example, if the golf course that is expected to be played is not included in the tee recommendation system (e.g., the course is not at sea level elevation or different from the standard of 18 holes/par 72 type course), then the system may not sync with the course. Another reason for failure is that the systems do not account for all possible variations associated with the course. For example, one or more of the aforementioned systems may fail to take into account the totality of the obstacles that exist throughout the golf course (e.g., ponds, trees, streams, bunkers). Another reason for their failure is that such systems make calculations based on variables and data that can change such as the conditions of a golf course. For example, a thunderstorm may cause the ground to retain more moisture, and the existing systems cannot account for such changed conditions and may thereby provide golfers with faulty recommendations.

As a result of such inadequacies in other tee recommendation systems, there remains a need for an improved system to provide more accurate recommendations to golfers in connection with optimal tees to play.

SUMMARY OF THE INVENTION

In general, in one aspect, exemplary embodiments of the present application provide a system for recommending to a user an optimal starting tee for one or more golf course holes of a golf course, each golf course hole of the golf course having a plurality of designated starting tees, the system including a host terminal including an application including one or more programs of instruction embodied in a non-transitory computer readable medium and executable by a processor to configure the application and a user interface configured to receive instructions from the user requesting a recommendation of the optimal starting tee for the user from the plurality of designated starting tees for the one or more golf course holes and to present the recommendation to the user, and a starting tee optimizing apparatus including one or more programs of instruction embodied in a non-transitory computer readable medium and executable by a processor to configure the starting tee optimizing apparatus and a determination module configured to determine the optimal starting tee for the user from the plurality of designated starting tees for the one or more golf course holes based on golf course information and user information.

Implementations of the various exemplary embodiments of the present application may include one or more of the following features. The user information may be obtained from the user via the user interface on the application of the host terminal. The user information may include at least one of a handicap or scoring ability, a hitting distance capability, and a course difficulty preference. The golf course information may include static golf course information that includes at least one of course length, hole length, hole placement, starting tee placement, and obstacle placement, or dynamic golf course information that includes at least one of moisture level in the soil, temperature, wind speed and direction, and humidity. The system may further include a database including the static golf course information for one or more golf courses, the database being connected to or in communication with the starting tee optimizing apparatus. The system may further include one or more sensors configured to automatically detect changes in the dynamic golf course information with respect to a golf course and to continuously communicate the changes to the starting tee optimizing apparatus. The host terminal may be configured as a desktop computer, a tablet computer, a laptop or notebook computer, a personal digital assistant (PDA), a mobile phone, a handset, or a mobile information terminal. The starting tee optimizing apparatus may be configured as a server or a computing device.

In general, in another aspect, exemplary embodiments of the present application provide an apparatus for recommending to a user an optimal starting tee for one or more golf course holes of a golf course, each golf course hole of the golf course having a plurality of designated starting tees, the apparatus including one or more programs of instruction embodied in a non-transitory computer readable medium and executable by a processor to configure the apparatus and a determination module configured to determine the optimal starting tee for the user from the plurality of designated starting tees for the one or more golf course holes based on golf course information and user information.

Implementations of the various exemplary embodiments of the present application may include one or more of the following features. The user information may be obtained from the user via a user interface on an application of a host terminal. The user information may include at least one of a handicap or scoring ability, a hitting distance capability, and a course difficulty preference. The golf course information may include static golf course information that includes at least one of course length, hole length, hole placement, starting tee placement, and obstacle placement, or dynamic golf course information that includes at least one of moisture level in the soil, temperature, wind speed and direction, and humidity. The apparatus may be connected to or in communication with a database including the static golf course information for one or more golf courses. The apparatus may be connected to or in communication with one or more sensors configured to automatically detect changes in the dynamic golf course information with respect to a golf course and to continuously communicate the changes to the apparatus.

In general, in another aspect, exemplary embodiments of the present application provide a method of recommending to a user an optimal starting tee for one or more golf course holes of a golf course, each golf course hole of the golf course having a plurality of designated starting tees, the method including receiving, via a user interface on an application of a host terminal, a selection of a golf course by the user, and determining, via a starting tee optimizing apparatus, the optimal starting tee for the user from the plurality of designated starting tees for the one or more golf course holes, where the host terminal includes the application including one or more programs of instruction embodied in a non-transitory computer readable medium and executable by a processor to configure the application and the user interface configured to receive instructions from the user requesting a recommendation of the optimal starting tee and to present the recommendation to the user, and where the starting tee optimizing apparatus includes one or more programs of instruction embodied in a non-transitory computer readable medium and executable by a processor to configure the starting tee optimizing apparatus and a determination module configured to determine the optimal starting tee for the user based on golf course information and user information.

Implementations of the various exemplary embodiments of the present application may include one or more of the following features. The user information may be obtained from the user via the user interface on the application of the host terminal. The user information may include at least one of a handicap or scoring ability, a hitting distance capability, and a course difficulty preference. The golf course information may include static golf course information that includes at least one of course length, hole length, hole placement, starting tee placement, and obstacle placement, or dynamic golf course information that includes at least one of moisture level in the soil, temperature, wind speed and direction, and humidity. The starting tee optimizing apparatus may be connected to or in communication with a database including the static golf course information for one or more golf courses. The starting tee optimizing apparatus may be connected to or in communication with one or more sensors configured to automatically detect changes in the dynamic golf course information with respect to a golf course and to continuously communicate the changes to the starting tee optimizing apparatus.

BRIEF DESCRIPTION OF THE DRAWINGS

The aforementioned and other aspects, features and advantages can be more readily understood from the following detailed description with reference to the accompanying drawings, wherein:

FIG. 5 shows an example of information that can be provided to a golfer either in a physical form, such as a billboard on a golf course, or a virtual form, such as on an application on a user's host terminal, e.g., smartphone, notebook computer or tablet computer.

DETAILED DESCRIPTION OF THE INVENTION

Figure 1A:
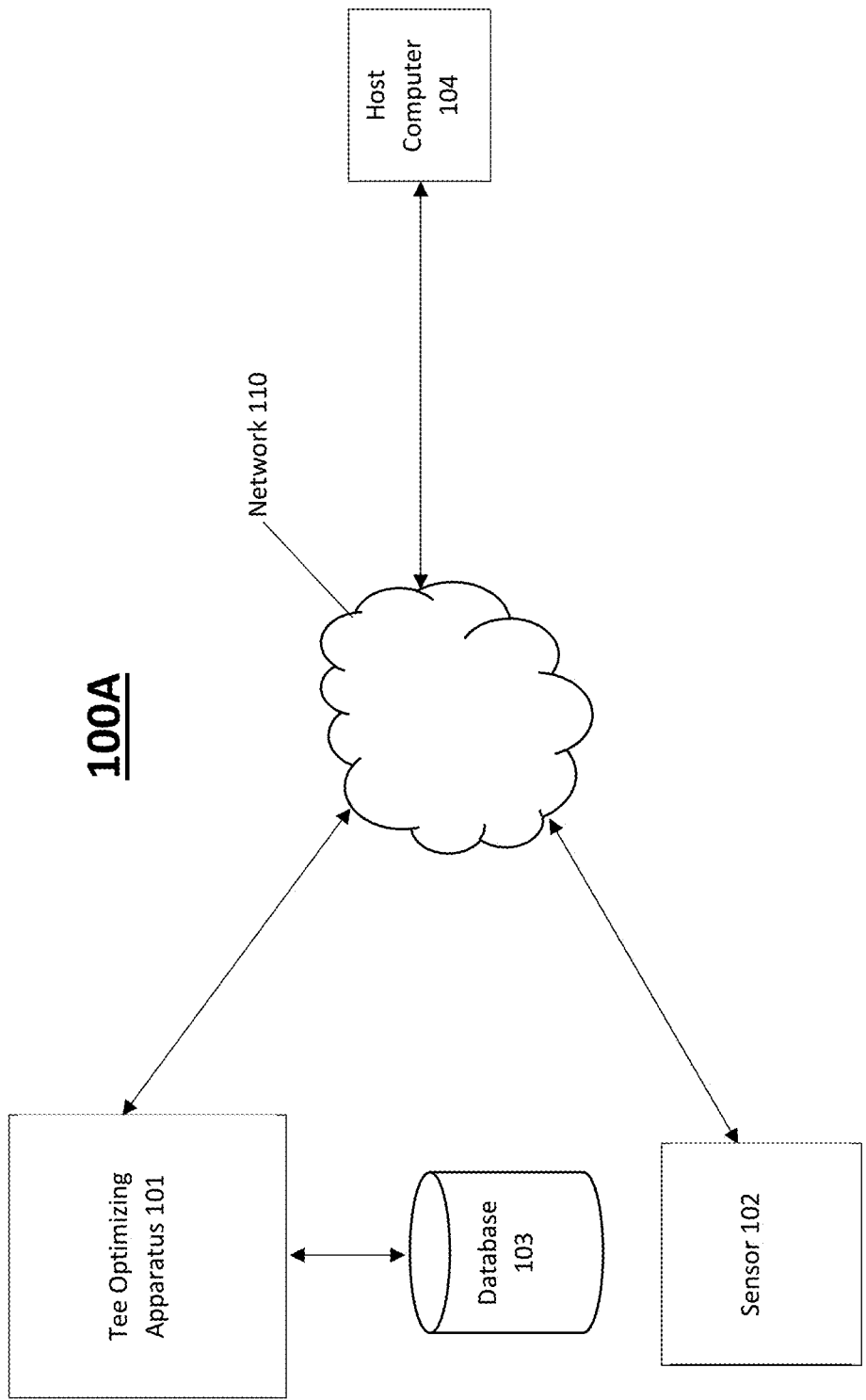
FIG. 1A shows a block diagram of tee optimizing system according to an embodiment of the present application.

In describing preferred embodiments illustrated in the drawings, specific terminology is employed herein for the sake of clarity. However, this disclosure is not intended to be limited to the specific terminology so selected and it is to be understood that each specific element includes all technical equivalents that operate in a similar manner. In addition, a detailed description of known functions and configurations is omitted from this specification when it may obscure the inventive aspects described herein.

Referring to the drawings, where like reference numerals designate identical or corresponding parts throughout the several views, FIG. 1A shows schematically a tee optimizing system 100A that includes a tee optimizing apparatus 101, a sensor 102, a database 103, and a host terminal 104, the tee optimizing apparatus 101, the sensor 102, the database 103, and the host terminal 104 being interconnected and in communication with each other by and through a network 110.

The tee optimizing apparatus 101 may be a server or a computing device that receives information from the sensor 102 and/or the host terminal 104 in order to determine an optimal tee from which a golfer should start to play. In other words, as mentioned previously, there may be multiple designated starting tees on a golf course, and the golfer may not be familiar with the course or may not be capable of gauging their golfing skills such that the golfer is able to select a starting tee that would be most suitable for them. The tee optimizing apparatus 101 may be configured to provide a recommended tee to the golfer, such that the golfer would be able to complete a golf game, e.g., the entire 18 holes, without becoming exhausted or frustrated by the number of strokes required to complete a hole or the length of time to play.

As such, the golfer or user may initiate the process to determine the optimal tee by providing instructions and personal information on a tee optimizing application on the host terminal 104. The tee optimizing application may include a user interface to present, e.g., display, information in a visual and/or audio manner and to receive instructions via user input. The instructions may include a request to determine an optimal tee for the golfer with respect to a specific golf course selected by the golfer.

The host terminal 104 can be any computing device, including but not limited to a desktop, tablet or laptop/notebook computer, a PDA (personal digital assistant), a mobile phone or hand-set, or another mobile information terminal, any of which can communicate with other devices through the network 110. The tee optimizing application may allow the golfer or user to create an account and may also request from the golfer personal information about the individual during the account creation. Such information may include, but is not limited to, handicap or scoring ability, hitting distance capability, and preferred course difficulty. It should be noted that the golfer is not required to input the golfer's personal information upon the creation of the account and may input the golfer's information at a later point in time, e.g., when requesting the tee optimizing apparatus to determine an optimal tee for the golfer. It should also be noted that the golfer is not required to input each and every item of requested golfer information. Instead, the more information that the golfer inputs into the tee optimizing application, the more accurate the optimal tee as recommended by the tee optimizing apparatus will be.

The handicap is the measure of a golfer's playing ability. It may include a Handicap Index® which is defined by the World Handicap System as a golfer's demonstrated ability calculated against the Slope Rating of a golf course of standard playing difficulty, which is a Slope Rating of 113. The handicap is measured before play through a verified process in which the golfer generates a handicap score, verified by a witness who, according to the Rules of Golf, has formed a reasonable basis from which to provide support for a score that has been posted or to challenge the player based on any anomalies in the posted score, or who has knowledge of the golfer's demonstrated ability and can reasonably verify or challenge the Handicap Index issued to the golfer.

The hitting distance capability is the measured distance that a golf ball travels when hit with a specific golf club. In other words, the golfer selects one or more clubs to hit the ball and measures the distance that the golf ball travels to obtain the hitting distance. It may be preferable to utilize multiple clubs because the more information that is obtained, the more accurate the determination made by the tee optimizing apparatus will be. It should be noted that the hitting distance includes bounces and rolls on flat surfaces having a typical firmness without any wind. In other words, with conditions such as bounces, rolls, and flat surfaces with typical firmness present, the measured distance is calculated from a first point where the golf ball is located before being hit with the club to a second point when the golf ball stops moving. It should also be noted that preferable golf clubs for the starting tee typically include drivers, 7-irons, and pitching wedges. Further, utilization of these preferred golf clubs is advantageous because the ratio of playing length to hitting distance is narrower using the preferred clubs compared to using only a single 7-iron club. Utilization of the preferred clubs is also advantageous in that other systems, e.g., Longleaf, Tee It Forward, and PGAoA Set-up for Success, are based on use of a driver club, which generates less accurate information because the hitting distance is more exaggerated. As another example, the 5-iron club used in the 5-iron×36 system also provides less accurate information compared to use of the preferred clubs because the 5-iron club is difficult to hit with and is not carried by a significant number of golfers.

Nevertheless, there may be situations in which the golfer is unable to calculate the hitting distance. For example, the user may not have a means of measuring the distance from the first point to the second point or it may not be practical for the user to do so, e.g., due to having inaccurate equipment or it would be too time consuming. In such cases, an alternative approach may be preferred. The golfer may instead calculate the hitting distance utilizing the swing speed of the golfer in combination with a mathematical model. For example, the golfer may use a swing-tracking device that tracks the movement of a golf club, e.g., via image recognition technology or by communicating with a tracking sensor removably attached to the golf club. In cases in which the golfer has no device with them to calculate the measured distance or the swing speed, the golfer may also resort to using an estimated hitting distance, which may be based upon the golfer's personal judgment, the Handicap Index, scoring ability, or the estimated average score of the golfer.

The preferred course difficulty may also be considered in performing the determination of an optimal tee for the golfer. The golfer may not be satisfied with playing a round of golf using the difficulty level most suitable for them; instead, the golfer may wish to have a difficulty level suitable for their current playing skills, a more challenging difficulty level in order to improve their golf skills, or an easy difficulty level to have a relaxing time playing the sport. Nevertheless, it may still be difficult for the golfer to determining the optimal tee at which to start. For example, the golfer may select a tee that is too challenging for the golfer, leading to a frustrating round. As such, the tee optimizing apparatus may also account for the golfer's difficulty level preference.

Figure 2:
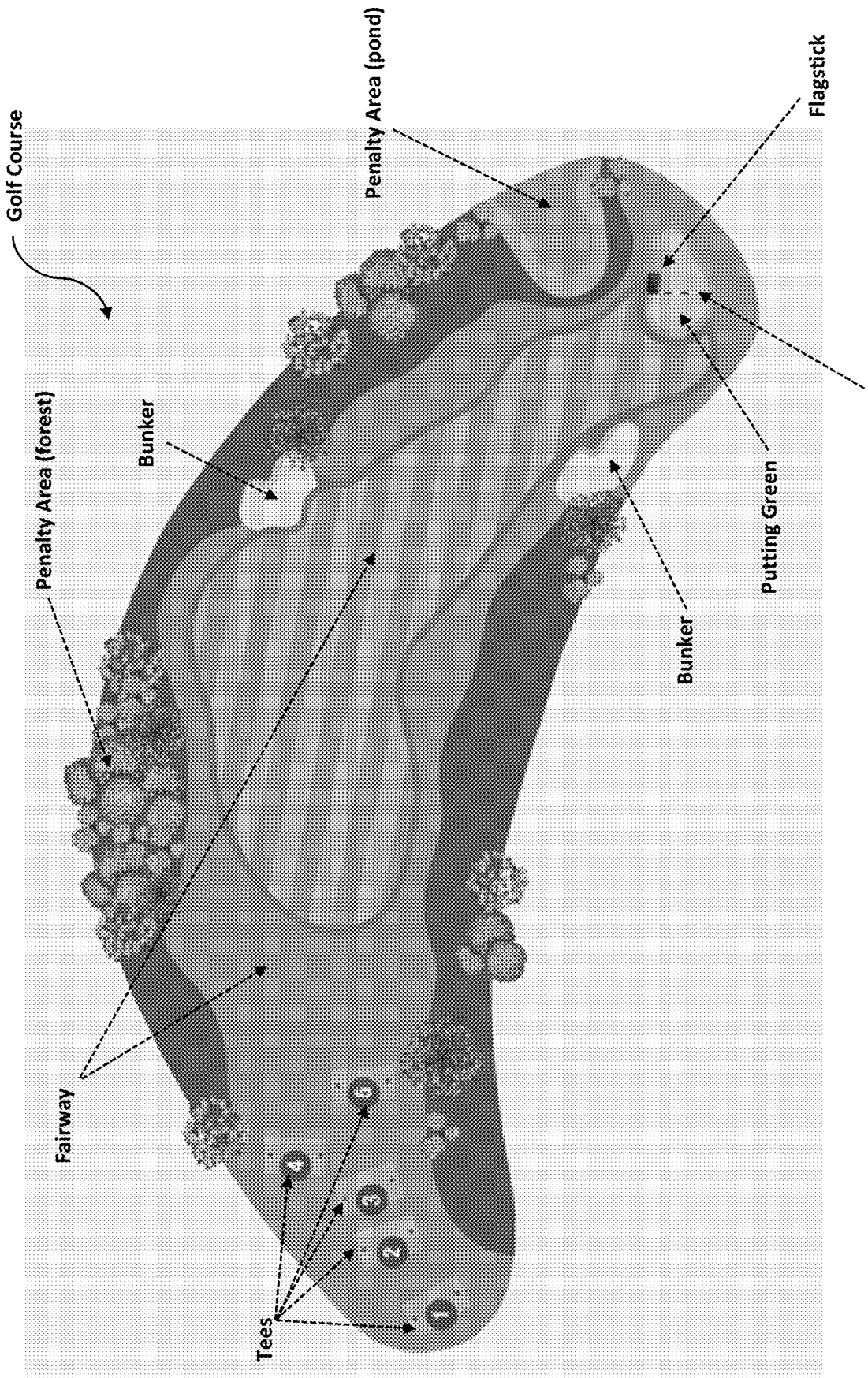
FIG. 2 shows a diagram of a golf course including labels that indicate the features that may be included in the golf course.

After receiving the instructions, including the selected golf course and the golfer's information from the golfer via the host terminal 104, the tee optimizing application may communicate such instructions and information to the tee optimizing apparatus. Next, in response to such instructions, the tee optimizing apparatus 101 may additionally obtain course information from one or more sources, e.g., sensor 102 or database 103, based on the course selected by the golfer. The course information may include properties or features of the golf course. In one exemplary embodiment, the course information may include the number of playing lengths or tees offered, number of holes, score card length or Effective Playing Length (EPL) of each hole for all physical or scorecard combination tees, par for each hole, or a combination of any of these. As shown in FIG. 2, a golf course includes one or more starting tees 1-5, a fairway, one or more penalty areas, one or more bunkers, a putting green, a flagstick and a hole. To begin the game of golf, the player starts from one of the tees 1-5, and attempts to move the ball by repeatedly hitting it with a golf club until the ball eventually lands in the hole near the flagstick. Each hit is considered a stroke, and to win a round of golf the golfer must be the one who plays as fewest strokes as possible when compared to other competing golfers. It should be noted that, while FIG. 2 includes a single hole, this is merely exemplary. A golf course can include many holes, thereby allowing for many rounds of golf. However, for the sake of simplicity, FIG. 2 and FIG. 3 include a single hole.

Figure 3:
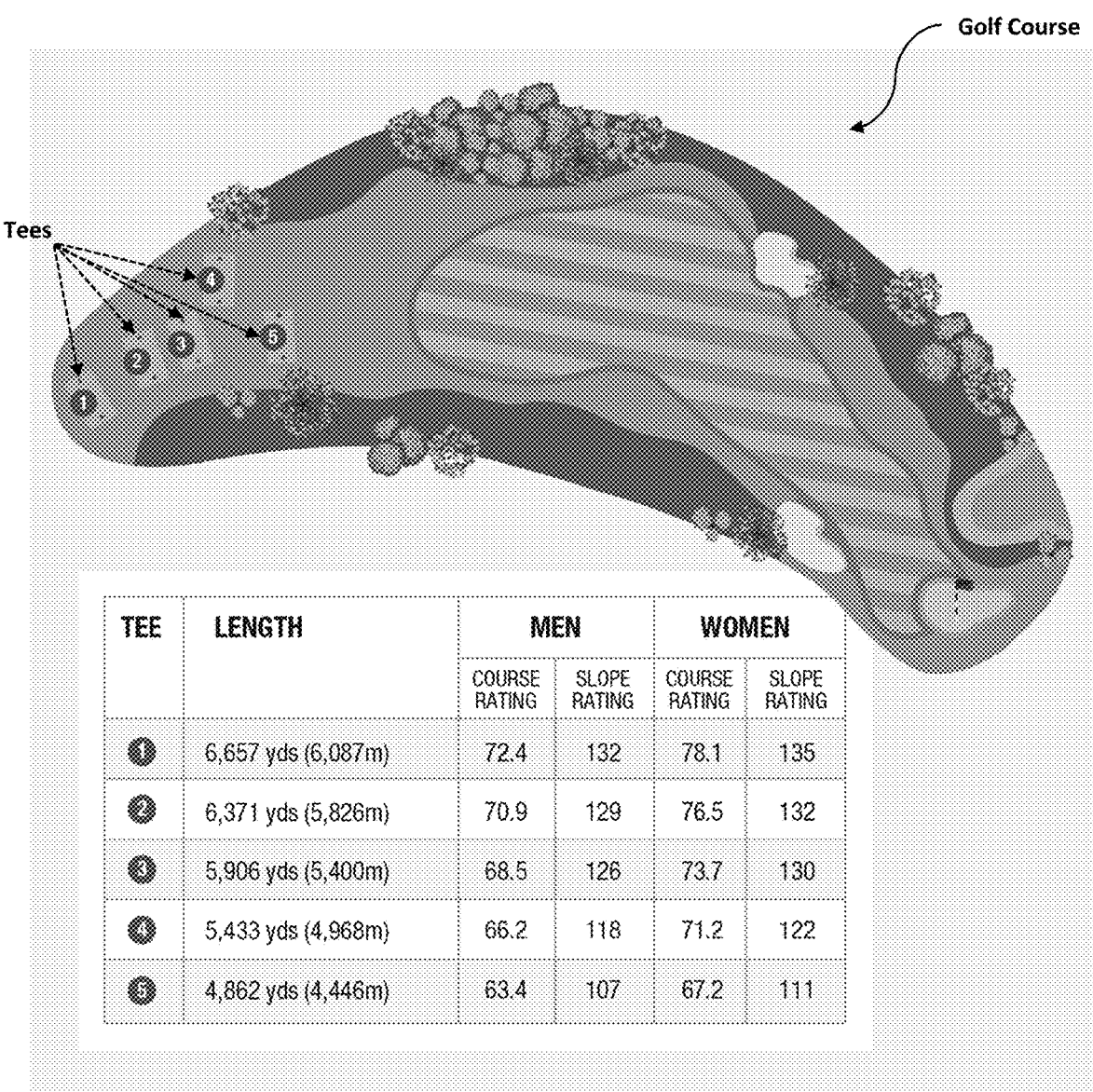
FIG. 3 shows a diagram of a golf course including information with respect to one or more starting tees as well as exemplary Course Ratings™ and Slope Ratings® for men and women.

One of the challenges of golf emanates from maintaining the golf ball on the fairway and the putting green until it reaches the hole, while preventing the ball from landing in an undesirable area such as a bunker, a sand trap, or a penalty area such as a pond or forest. Other challenges include hitting the golf ball into areas full of obstacles, e.g., rocks, or in areas where the golf course includes steep up-hills or a sharp curve. In addition, golfers also may need to account for fairway firmness, rough height, green speed, and green firmness. Moreover, the golfers may also need to account for external environmental variables, e.g., daily course conditions such as interference from the wind or rain or other weather conditions. Due to these environmental obstacles, each golf course may be rated according to a different difficulty level such as Course Rating or Slope Rating, as shown in FIG. 3. For example, the Course Rating is generated specifically for scratch golfers, i.e., golfers with a zero handicap, while Slope Rating is utilized for bogey golfers, i.e., golfers with some handicap.

The Course Rating and the Slope Rating are calculated based on the effective playing length (EPL) and/or the bogey obstacle stroke value (BOSV). BOSV is a numerical rating that represents the difficulty of the obstacles on the golf course. According to the Course Rating System, the EPL of a course is the measured length corrected for roll, changes in elevation, forced lay ups and doglegs, wind, and altitude above sea level. In other words, the EPL is a possible representation of the required number of strokes to hit the golf ball for a scratch or proficient golfer to complete a hole, i.e., par value. For example, a hole that is at a physical distance of 500 yards from the starting tee may require a golfer at an initial glance to continuously hit the golf ball for a distance of 500 yards. In such a case, a par value of 5 may be assigned to the hole. However, the physical properties of the course, such as downhills, or the surrounding environment, e.g., regular winds, may cause the distance to be "shortened" from the perspective of the golfer because the golf ball is able to travel farther due to such external forces. As a result, the golfer may only need to hit the golf ball for 400 yards before he or she completes the hole. In such a case, a par value of 4 may be more appropriate, thereby making the course easier or less difficult than a normal course with a physical distance of 500 yards but none of the external forces that cause the golf ball to travel a greater distance.

It should be noted that the database 103, which is connected to the tee optimizing apparatus 101, includes information regarding each golf course. Such information may correspond to static features of the golf course, i.e., static course information, such as tee placement, hole placement, and obstacle placement where the rocks, bunkers and ponds are located on the golf course. It is unlikely that such static features may be modified, unless the owner of the golf course decides to renovate, modify or expand the golf course. For example, the database 103 may include information on individual golf courses in different geographic locations, including different cities, states, and countries.

The sensor 102 may be any type of sensor that detects changes in-real time in the dynamic course conditions, i.e., daily environmental course conditions. For example, the sensor 102 may detect the changes in moisture in the soil of the golf course. In another example, the sensor 102 may detect changes in the wind, such as direction and/or speed. In yet another example, the sensor 102 may also detect the temperature and/or humidity on the golf course. In a further example, the sensor 102 may also detect changes in weather, such as rain, snow, sleet, or fog. In short, the sensor 102 is capable of determining one or more and/or a combination of the aforementioned environmental variables, and sensors may be placed in strategic locations throughout the golf course, such that sensors are able to produce the most accurate measured data. In addition, the sensor 102 may include communication capabilities, such as a wireless network module that allows the sensor 102 to continuously and automatically communicate information to the tee optimizing apparatus 101 in real time. In an exemplary embodiment, the sensor 102 may also include means for receiving power, e.g., electricity, for operating the sensor 102. For example, the sensor 102 may include solar panels that allow for the receipt of energy from the sun. In another example, the sensor 102 may be connected to an electrical grid. In yet another example, the sensor 102 may be connected to a battery.

Figure 4:
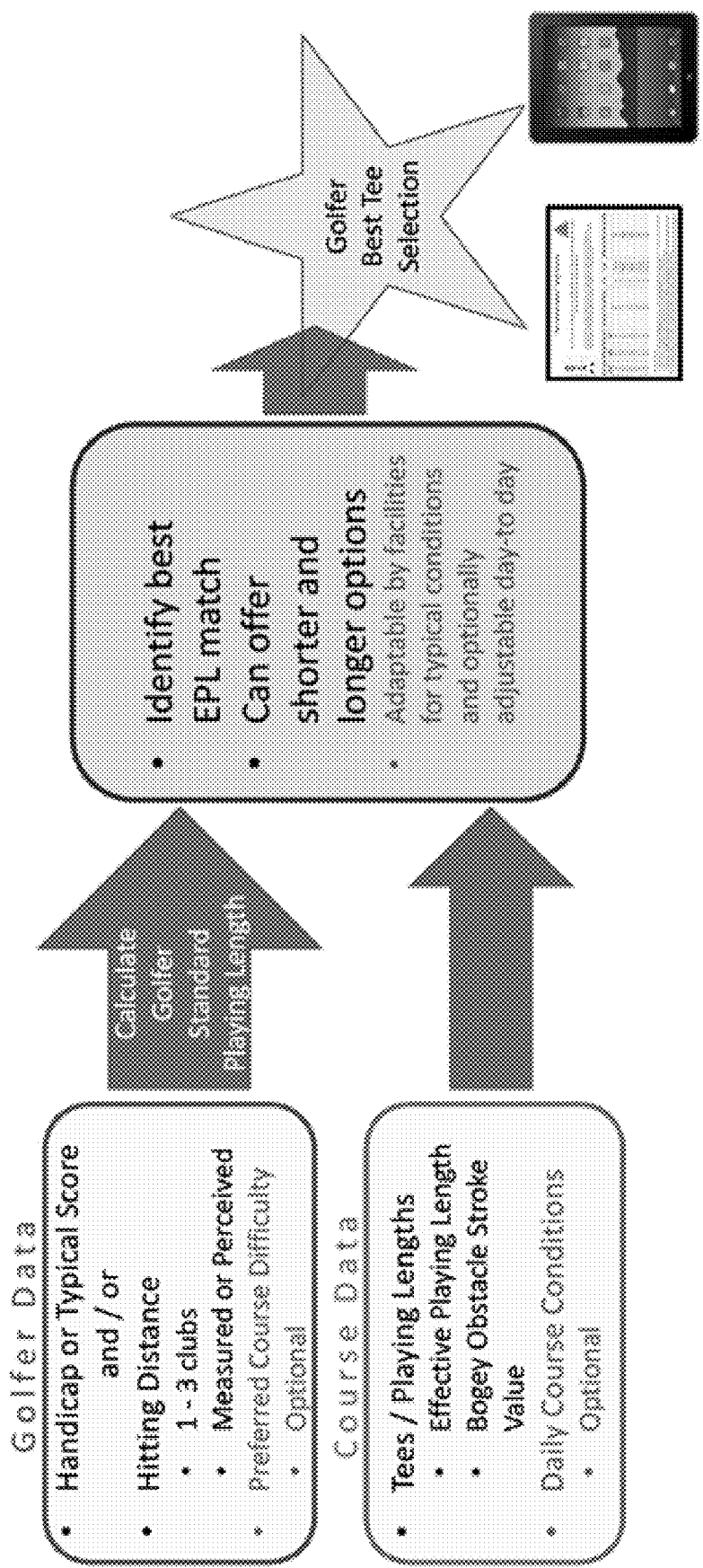
FIG. 4 shows a schematic diagram of a process that may be performed by a tee optimizing apparatus of the system of FIGS. 1A-1B.

After receiving the golfer information and course information, the tee optimizing apparatus updates the course information based on the information obtained from the sensor 102, such that the EPL and BOSV are updated. Next, the tee optimizing apparatus determines the EPL for each of the one or more tees with respect to the hole. As described previously, a golf course can provide more than one starting tee with respect to a single hole in order to accommodate players of different skill levels. As such, the tee optimizing apparatus determines or updates the EPL for each of the one or more tees with respect to the hole. In the example shown in FIGS. 2 and 3, there are 5 tees and 1 hole. As such, the tee optimizing apparatus may calculate 5 EPL's. After calculating the EPL's, the tee optimizing apparatus then determines which is the optimal tee, based on the EPL, for the golfer based on the golfer information. Finally, the tee optimizing apparatus determines the optimal tee and sends such information to the tee optimizing application on the host terminal 104, which then presents the optimal tee to the golfer. It should be noted that the tee optimizing apparatus may determine that there is no tee that is exactly suitable for the golfer. In such a case, the tee optimizing apparatus may present information, as shown in FIG. 4, for the golfer to decide for themself from which tee to play. Such information shown in FIG. 4 may be displayed to the user on the user interface of the tee optimizing apparatus of the host terminal 104. In an alternative embodiment, the tee optimizing apparatus may also provide the golfer with the optimal tee that is closest to the suitability of the golfer.

In an exemplary embodiment, the tee optimizing apparatus continuously updates the EPL of each of the golf courses stored in the database 103 using the information from the sensors 102. In another exemplary embodiment, the tee optimizing apparatus may continuously re-determine the optimal tee provided to the golfer.

In another exemplary embodiment, the golfer can perform hypothetical calculations, in which the golfer requests the tee optimizing apparatus to recommend tees for various golf courses. As stated previously, the tee optimizing apparatus 101 may include information for many golf courses disposed all over the country. For example, the golfer may live near two golf courses, and can select which golf course to play that day. However, a thunderstorm may have occurred overnight causing changes in the condition of the golf course. As such, the golfer may request the tee optimizing apparatus to recommend optimal tees with respect to each of the two golf courses. In other words, the golfer can select two or more golf courses in the request to the tee optimizing apparatus. It is possible that due to the changes in playing conditions, the EPL has also changed for each of the two golf courses. For example, one golf course may not have any suitable tees for the golfer at a particular time, but the other golf course does have a suitable tee. As such, the tee optimizing apparatus may recommend to the golfer the other golf course along with the optimal tee.

The network 110 can be a local area network, a wide area network, or any type of network such as an intranet or an extranet to provide controlled access to external users, for example, through the Internet, cellular networks such as 3G, 4G, 5G, a private or public cloud network, or a combination thereof. In addition, the network 110 preferably uses TCP/IP (Transmission Control Protocol/Internet Protocol), but other protocols such as SNMP (Simple Network Management Protocol) and HTTP (Hypertext Transfer Protocol) can also be used.

Figure 1B:
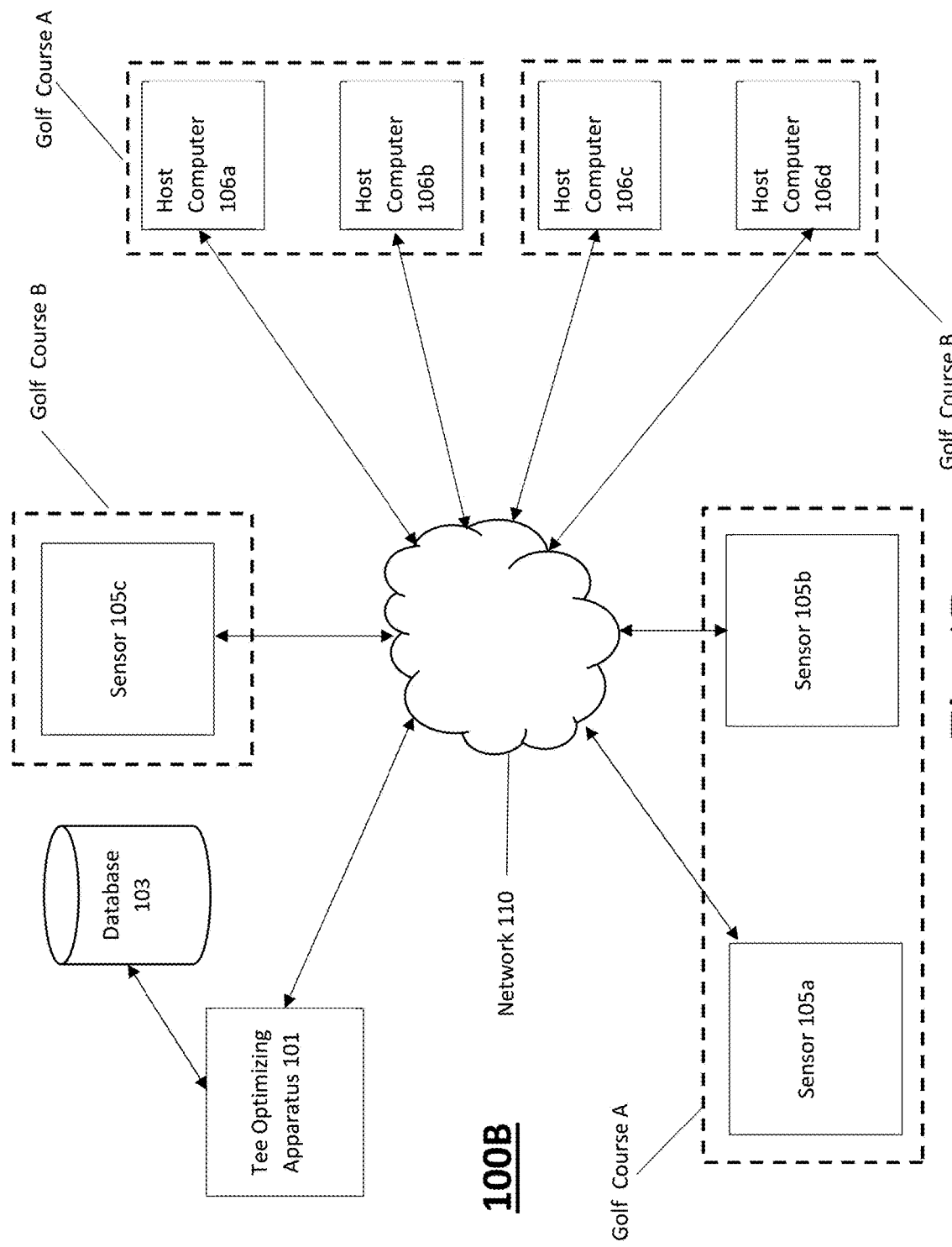
FIG. 1B shows a block diagram of a tee optimizing system according to another embodiment of the present application.

FIG. 1B shows schematically a tee optimizing system 100B according to an exemplary embodiment. The system 100B is similar to the system 100A except that the system 100B includes multiple sensors 105a-105c and host terminals 106a-106d.

Each of the multiple sensors 105a-105c is substantially similar to the sensors 102 in the system 100A of FIG. 1A. However, the sensors 105a-105c may be grouped differently and disposed at different locations. For example, the sensors 105a and 105b are disposed on golf course A, while the sensor 105c is disposed on golf course B, which may be located at a different location than a golf course A. Next, the sensors 105a-105c may be all different or the same in nature. For example, all of the sensors 105a-105c may detect moisture level in the soil. In another example, only the sensors 105a and 105b detect moisture level in the soil and the sensor 105c detects changes in temperature. In yet another example, the sensor 105a may detect wind speed, the sensor 105b may detect temperature, and the sensor 105c may detect moisture level in the soil.

Each of the one or more host terminals 106a-106 is substantially similar to the host terminal 104 in the system 100A of FIG. 1A. For example, the host terminals 106a and 106b may belong to a first golfer and a second golfer on golf course A, respectively. In another example, the host terminals 106c and 106d may belong to a third golfer and a fourth golfer on golf course B, respectively. As such, golfers on golf course A and/or golf course B can request, via their respective tee optimizing applications on the host terminals, the tee optimizing apparatus for a recommended optimal tee.

The embodiments and examples above are illustrative, and many variations can be introduced to them without departing from the spirit of the disclosure or from the scope of the appended claims. For example, elements and/or features of different illustrative and exemplary embodiments herein may be combined with each other and/or substituted with each other within the scope of this disclosure. For a better understanding of the invention, its operating advantages and the specific objects attained by its uses, reference should be had to the accompanying drawings and descriptive matter in which there are illustrated exemplary embodiments of the invention.

What is claimed is:

1. A system for recommending to a user an optimal starting tee for one or more golf course holes of a golf course, each golf course hole of the golf course having a plurality of designated starting tees, the system comprising:
 a host terminal comprising:
  an application comprising:
   one or more programs of instruction embodied in a non-transitory computer readable medium and executable by a processor to configure the application; and
   a user interface configured to receive instructions from the user requesting a recommendation of the optimal starting tee for the user from the plurality of designated starting tees for the one or more golf course holes and to present the recommendation to the user;
 a starting tee optimizing apparatus comprising:
  one or more programs of instruction embodied in a non-transitory computer readable medium and executable by a processor to configure the starting tee optimizing apparatus; and
 a determination module configured to determine the optimal starting tee for the user from the plurality of designated starting tees for the one or more golf course holes based on golf course information, user information, and an effective playing length, wherein the golf course information includes dynamic golf course information, and the effective playing length is calculated for each of the plurality of designated starting tees for the one or more golf course holes; and
 one or more sensors configured to automatically detect changes in dynamic golf course information with respect to a golf course and to continuously communicate the changes to the starting tee optimizing apparatus;
 wherein the determination module is configured to determine the optimal starting tee for the user separately for each of the one or more golf course holes.

2. The system of claim 1, wherein the user information is obtained from the user via the user interface on the application of the host terminal.

3. The system of claim 1, wherein the user information includes at least one of a handicap or scoring ability, a hitting distance capability, and a course difficulty preference.

4. The system of claim 1, wherein the golf course information includes static golf course information that includes at least one of course length, hole length, hole placement, starting tee placement, and obstacle placement, and the dynamic golf course information that includes at least one of moisture level in the soil, temperature, wind speed and direction, and humidity.

5. The system of claim 4, further comprising:
a database including the static golf course information for one or more golf courses, the database being connected to or in communication with the starting tee optimizing apparatus.

6. The system of claim 1, wherein the host terminal is configured as a desktop computer, a tablet computer, a laptop or notebook computer, a personal digital assistant (PDA), a mobile phone, a hand-set, or a mobile information terminal.

7. The system of claim 1, wherein the starting tee optimizing apparatus is configured as a server or a computing device.

8. An apparatus for recommending to a user an optimal starting tee for one or more golf course holes of a golf course, each golf course hole of the golf course having a plurality of designated starting tees, the apparatus comprising:
one or more programs of instruction embodied in a non-transitory computer readable medium and executable by a processor to configure the apparatus; and
a determination module configured to determine the optimal starting tee for the user from the plurality of designated starting tees for the one or more golf course holes based on golf course information, user information, and an effective playing length, wherein the golf course information includes dynamic golf course information, and the effective playing length is calculated for each of the plurality of designated starting tees for the one or more golf course holes;
wherein the apparatus is connected to or in communication with one or more sensors configured to automatically detect changes in dynamic golf course information with respect to a golf course and to continuously communicate the changes to the apparatus; and
wherein the determination module is configured to determine the optimal starting tee for the user for each of the one or more golf course holes.

9. The apparatus of claim 8, wherein the user information is obtained from the user via a user interface on an application of a host terminal.

10. The apparatus of claim 8, wherein the user information includes at least one of a handicap or scoring ability, a hitting distance capability, and a course difficulty preference.

11. The apparatus of claim 8, wherein the golf course information includes static golf course information that includes at least one of course length, hole length, hole placement, starting tee placement, and obstacle placement, and the dynamic golf course information that includes at least one of moisture level in the soil, temperature, wind speed and direction, and humidity.

12. The apparatus of claim 11, wherein the apparatus is connected to or in communication with a database including the static golf course information for one or more golf courses.

13. A method of recommending to a user an optimal starting tee for one or more golf course holes of a golf course, each golf course hole of the golf course having a plurality of designated starting tees, the method comprising:
receiving, via a user interface on an application of a host terminal, a selection of a golf course by the user; and
determining, via a starting tee optimizing apparatus, the optimal starting tee for the user from the plurality of designated starting tees for the one or more golf course holes;
wherein the host terminal comprises the application comprising one or more programs of instruction embodied in a non-transitory computer readable medium and executable by a processor to configure the application and the user interface configured to receive instructions from the user requesting a recommendation of the optimal starting tee and to present the recommendation to the user;
wherein the starting tee optimizing apparatus comprises one or more programs of instruction embodied in a non-transitory computer readable medium and executable by a processor to configure the starting tee optimizing apparatus and a determination module configured to determine the optimal starting tee for the user based on golf course information, user information, and an effective playing length, wherein the golf course information includes dynamic golf course information, and the effective playing length is calculated for each of the plurality of designated starting tees for the one or more golf course holes;
wherein the starting tee optimizing apparatus is connected to or in communication with one or more sensors configured to automatically detect changes in dynamic golf course information with respect to a golf course and to continuously communicate the changes to the starting tee optimizing apparatus; and
wherein the determination module is configured to determine the optimal starting tee for the user for each of the one or more golf course holes.

14. The method of claim 13, wherein the user information is obtained from the user via the user interface on the application of the host terminal.

15. The method of claim 13, wherein the user information includes at least one of a handicap or scoring ability, a hitting distance capability, and a course difficulty preference.

16. The method of claim 13, wherein the golf course information includes static golf course information that includes at least one of course length, hole length, hole placement, starting tee placement, and obstacle placement, and the dynamic golf course information that includes at least one of moisture level in the soil, temperature, wind speed and direction, and humidity.

17. The method of claim 16, wherein the starting tee optimizing apparatus is connected to or in communication with a database including the static golf course information for one or more golf courses.

* * * * *